US012771134B2

(12) United States Patent
Li et al.

(10) Patent No.: US 12,771,134 B2
(45) Date of Patent: Oct. 20, 2026

(54) DEVICE AND METHOD FOR LOOP CLOSING AND BREAKING OF POWER DISTRIBUTION GRID BASED ON DECOUPLED VOLTAGE REGULATION, AND POWER DISTRIBUTION GRID

(71) Applicants: STATE GRID JIANGSU ELECTRIC POWER RESEARCH INSTITUTE, Nanjing (CN); JIANGSU ELECTRIC POWER RESEARCH INSTITUTE CO., LTD., Nanjing (CN)

(72) Inventors: Qun Li, Nanjing (CN); Ningyu Zhang, Nanjing (CN); Qian Zhou, Nanjing (CN); Jiankun Liu, Nanjing (CN); Jian Liu, Nanjing (CN); Jing Chen, Nanjing (CN); Xinyao Zhu, Nanjing (CN); Lei Gao, Nanjing (CN); Peng Li, Nanjing (CN); Jinjiao Lin, Nanjing (CN); Jianhua Zhou, Nanjing (CN)

(73) Assignees: STATE GRID JIANGSU ELECTRIC POWER RESEARCH INSTITUTE (CN); JIANGSU ELECTRIC POWER RESEARCH INSTITUTE CO., LTD. (CN)

( * ) Notice: Subject to any disclaimer, the term of this patent is extended or adjusted under 35 U.S.C. 154(b) by 417 days.

(21) Appl. No.: 18/556,025

(22) PCT Filed: Feb. 10, 2022

(86) PCT No.: PCT/CN2022/075832

§ 371 (c)(1),
(2) Date: Oct. 18, 2023

(87) PCT Pub. No.: WO2022/237251

PCT Pub. Date: Nov. 17, 2022

(65) Prior Publication Data

US 2024/0213777 A1 Jun. 27, 2024

(30) Foreign Application Priority Data

May 13, 2021 (CN) ......................... 202110524738.8

(51) Int. Cl.
*H02J 3/12* (2026.01)

(52) U.S. Cl.
CPC ..................................... *H02J 3/12* (2013.01)

(58) Field of Classification Search
None
See application file for complete search history.

(56) References Cited

U.S. PATENT DOCUMENTS

| | | | | |
|---|---|---|---|---|
| 10,673,232 B2 * | 6/2020 | Zhao | ......................... | H02J 3/00 |
| 2006/0195229 A1 * | 8/2006 | Bell | ......................... | H02J 3/00 700/286 |

(Continued)

*Primary Examiner* — Hua Lu

(57) ABSTRACT

A device for loop closing and breaking of a power distribution grid based on decoupled voltage regulation is provided. The device comprises a voltage-regulation phase shifter, a control system, a voltage acquisition device and a loop closing switch. The voltage acquisition device acquires voltage signals on two sides of the loop closing switch performing a loop closing or breaking operation and transmits the voltage signals to the control system. The control system calculates a compensating voltage amplitude and phase-angle according to the voltage signals, and sends an instruction to the voltage-regulation phase shifter according to the compensating voltage amplitude and phase-angle. The voltage-regulation phase shifter outputs the compensating voltage amplitude and phase-angle according to the instruction from the control system, to compensate for a voltage difference between the two sides of the loop closing switch.

6 Claims, 5 Drawing Sheets

(56) References Cited

U.S. PATENT DOCUMENTS

2010/0157632 A1* 6/2010 Batten .................... H02J 3/381 363/74
2011/0121752 A1* 5/2011 Newman, Jr. ........ H05B 39/048 315/291
2011/0121812 A1* 5/2011 Salvestrini ............ H05B 39/04 327/419
2013/0073109 A1* 3/2013 Cheng ...................... H02J 3/40 700/298
2013/0285739 A1* 10/2013 Blaquiere ...... G01R 31/318555 29/832
2014/0268926 A1* 9/2014 Gupta ...................... H02J 3/36 363/35
2014/0319910 A1* 10/2014 Divan ...................... G05F 1/70 307/20
2015/0100812 A1* 4/2015 Jing ........................ G06F 1/305 713/340
2015/0137520 A1* 5/2015 Garcia ...................... F03D 7/00 290/44
2016/0124421 A1* 5/2016 Hansell .................. H02J 13/13 700/286
2016/0156190 A1* 6/2016 Wells ........................ H02J 3/16 307/18
2016/0359326 A1* 12/2016 Sun .......................... H02J 3/10
2017/0214244 A1* 7/2017 Dall'Anese ......... H02J 13/1321
2017/0250540 A1* 8/2017 Varma ................ H02J 3/00142
2019/0052083 A1* 2/2019 Lucas, Jr. ............... H02J 13/12
2020/0006982 A1* 1/2020 Eckhardt ................ G05B 15/02
2020/0067423 A1* 2/2020 Maksimovic ....... H02M 7/4826
2021/0367422 A1* 11/2021 Li .......................... H01H 89/00
2022/0166223 A1* 5/2022 Varma .................. H02J 3/0014
2022/0190681 A1* 6/2022 Shine ........................ H02J 3/28
2022/0301767 A1* 9/2022 Ross .................... C07D 487/00
2025/0096708 A1* 3/2025 Rodriguez Vazquez .................... F03D 9/25

* cited by examiner

DEVICE AND METHOD FOR LOOP CLOSING AND BREAKING OF POWER DISTRIBUTION GRID BASED ON DECOUPLED VOLTAGE REGULATION, AND POWER DISTRIBUTION GRID

FIELD

The invention relates to the technical field of operation of power distribution grids, in particular to a device and method for loop closing and braking of a power distribution grid based on decoupled voltage regulation, and a power distribution grid.

BACKGROUND

Current power distribution grids in China operate in an open-loop manner. That is, during normal operation, the load is supplied by one distribution line; and in case of a fault or maintenance of the line, the load is transferred to lines through a power distribution grid to be supplied with power. Traditional power distribution lines transfer the load to other lines after a power failure, which cannot meet the requirement for uninterrupted continuous power supply anymore.

At present, most power distribution lines capable of meeting the requirements for continuous power supply of users are operated in a closed-loop manner, and under the influence of the operation condition of the system and the parameters of the power distribution grids, the risks such as equipment overload, false tripping of relay protection, out-of-limit short circuit current, and failure propagation resulting from electromagnetic looped networks may be caused by an excessive loop closing current. The main problem caused by the loop closing operation is an excessive loop closing current due to a voltage phase difference between busbars on two sides of a loop closing switch or an interconnection switch before loop closing, which will lead to false tripping of quick-break protection or overcurrent protection, power failures in a larger area, and bad consequences.

In view of the above problems, the inventor designs a device and method for loop closing and breaking of a power distribution grid based on decoupled voltage regulation, and a power distribution grid through active study and innovation based on years of rich practical experience and professional knowledge in engineering application of such products, by employing scientific principles or laws.

SUMMARY

The invention provides a device for loop closing and breaking of a power distribution grid based on decoupled voltage regulation to solve the problems mentioned in the description of related art. The invention further claims protection for a method for loop closing and breaking of a power distribution grid based on decoupled voltage regulation, and a power distribution grid, which have the same technical effects.

The technical solution adopted by the invention to fulfill the above objective is as follows:

A device for loop closing and breaking of a power distribution grid based on decoupled voltage regulation comprises a voltage-regulation phase shifter, a control system, a voltage acquisition device and a loop closing switch, wherein:

The voltage acquisition device acquires voltage signals on both sides of the loop closing switch performing a loop closing or breaking operation and transmits the voltage signals to the control system;

The control system calculates a compensating voltage amplitude and phase-angle according to the voltage signals, and sends an instruction to the voltage-regulation phase shifter according to the compensating voltage amplitude and phase-angle;

The voltage-regulation phase shifter outputs the compensating voltage amplitude and phase-angle according to the instruction from the control system.

Further, the voltage-regulation phase shifter comprises a parallel transformer and a series transformer;

The parallel transformer is a three-phase three-winding auto-transformer, and comprises primary-side auto-couplings a1, b1 and c1, and secondary-side windings a2, b2 and c2;

The series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; the amplitude regulation parts $\Delta U_{a1}$, $\Delta U_{b1}$ and $\Delta U_{c1}$ adopt delta connection and are connected to the primary-side auto-couplings of the parallel transformer; the phase-angle regulation parts $\Delta U_{a2}$, $\Delta U_{b2}$ and $\Delta U_{c2}$ adopt star connection and are connected to the secondary-side windings of the parallel transformer;

The control system is connected to taps of the primary-side auto-couplings and taps of the secondary-side windings.

A method for loop closing and breaking of a power distribution grid based on decoupled voltage regulation comprises the following steps:

Acquiring voltage signals on both sides of a loop closing switch which performs a loop closing or breaking operation;

Calculating a compensating voltage amplitude and phase-angle according to the voltage signals; and Outputting a compensating voltage through voltage regulation to compensate for the compensating voltage amplitude and phase-angle, and then, performing the loop closing or breaking operation.

Further, a parallel transformer and a series transformer are used for voltage regulation:

The parallel transformer is a three-phase three-winding auto-transformer, and comprises primary-side auto-couplings a1, b1 and c1, and secondary-side windings a2, b2 and c2;

The series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; wherein, the amplitude regulation parts 4 $U_{a1}$, $\Delta U_{b1}$ and $\Delta U_{c1}$ adopt delta connection and are connected to the primary-side auto-couplings of the parallel transformer; the phase-angle regulation parts $\Delta U_{a2}$, $\Delta U_{b2}$ and $\Delta U_{c2}$ adopt star connection and are connected to the secondary-side windings of the parallel transformer;

Decoupled control of the compensating voltage amplitude and phase-angle is realized through independent regulation of taps of the primary-side auto-windings and taps of the secondary-side windings.

A power distribution grid comprises:

A first power supply circuit comprising a power supply $S_1$, a loop closing switch $K_1$ and a load $R_1$ which are connected in series;

A second power supply circuit comprising a power supply $S_2$, a loop closing switch $K_2$ and a load $R_2$ which are connected in series; and A voltage-regulation phase shifter, a control system and a voltage acquisition device;

A side, connected to the load $R_1$, of the loop closing switch $K_1$ is connected to the voltage-regulation phase shifter through a loop closing switch $K_3$; a side, connected to the load $R_2$, of the loop closing switch $K_2$ is connected to the voltage-regulation phase shifter through a loop closing switch $K_4$; the voltage acquisition device is connected to the control system, the loop closing switch $K_1$, the loop closing switch $K_2$, the loop closing switch $K_3$ and the loop closing switch $K_4$, acquires voltage signals on two sides of a designated loop closing switch, and transmits the voltage signals to the control system;

The control system calculates a compensating voltage amplitude and phase-angle according to the voltage signals, and sends an instruction to the voltage-regulation phase shifter according to the compensating voltage amplitude and phase-angle;

The voltage-regulation phase shifter outputs the compensating voltage amplitude and phase-angle according to the instruction from the control system.

Further, the voltage-regulation phase shifter comprises a parallel transformer and a series transformer;

The parallel transformer is a three-phase three-winding auto-transformer, and comprises primary-side auto-couplings a1, b1 and c1, and secondary-side windings a2, b2 and c2;

The series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; the amplitude regulation parts $\Delta U_{a1}$, $\Delta U_{b1}$ and $\Delta U_{c1}$ adopt delta connection and are connected to the primary-side auto-couplings of the parallel transformer; the phase-angle regulation parts $\Delta U_{a2}$, $\Delta U_{b2}$ and $\Delta U_{c2}$ adopt star connection and are connected to the secondary-side windings of the parallel transformer;

The control system is connected to taps of the primary-side auto-couplings and taps of the secondary-side windings.

Further, when the power distribution grid operates normally, the loop closing switch $K_1$ and the loop closing switch $K_2$ are closed, the power supply $S_1$ supplies power to the load $R_1$, and the power supply $S_2$ supplies power to the load $R_2$; when a loop closing operation of the power distribution grid is needed, the following steps are performed:

Closing the loop closing switch $K_3$, and connecting the voltage-regulation phase shifter to the power distribution grid;

Acquiring, by the control system, voltages on two sides of the loop closing switch $K_4$, and calculating a compensating voltage according to a difference between the voltages on the two sides;

Calculating, by the control system, an operating position of the voltage-regulation phase shifter according to the compensating voltage, and sending the operating position to the voltage-regulation phase shifter to implement a voltage-regulation phase shift; and Recalculating, by the control system, the voltages on the two sides the loop closing switch $K_4$ until the compensating voltage is less than a set threshold, closing the loop-closing switch $K_4$ to complete loop closing, and opening the loop closing switch $K_2$ to complete loop breaking, and supplying power to the load $R_2$ by the power supply $S_1$.

Further, when a line on the power supply $S_2$ side of the power distribution grid is under maintenance, the loop closing switch $K_1$, the loop closing switch $K_3$ and the loop closing switch $K_4$ are closed, the loop closing switch $K_2$ is opened, and the power supply $S_1$ supplies power to the load $R_1$ and the load $R_2$; when the load $R_2$ is switched to be supplied with power by the power supply $S_2$ independently after the line on the power supply $S_2$ side is maintained, a loop breaking operation of the power distribution grid is performed through the following steps:

Acquiring, by the control system, voltages on two sides of the loop closing switch $K_2$, and calculating a compensating voltage according to a difference between the voltages on the two sides;

Controlling, by the control system, the voltage-regulation phase shifter to perform voltage regulation according to the compensating voltage; and Recalculating, by the control system, the voltages on the two sides the loop closing switch $K_2$ until the compensating voltage is less than a set threshold, closing the loop-closing switch $K_2$ to complete loop closing, and opening the loop closing switch $K_4$ to complete loop breaking, and supplying power to the load $R_2$ by the power supply $S_2$.

Further, the control system realizes decoupled control of the compensating voltage amplitude and phase-angle through independent regulation of the taps of the primary-side auto-couplings and the taps of the secondary-side windings.

By adoption of the technical solution, the invention has the following technical effects:

Through the voltage-regulation phase shift, the loop closing or breaking operation can be effectively implemented in case of a large difference in amplitude and phase angle of bus voltages of the power distribution gird, an excessive loop closing current can be effective avoided in the loop closing process, and false tripping of quick-break protection or over-current protection is avoided.

BRIEF DESCRIPTION OF THE DRAWINGS

To more clearly explain the technical solutions of the embodiments of the invention or the prior art, drawings used for describing the embodiments of the invention or the prior art will be briefly introduced below. Obviously, the drawings in the following description merely illustrate some embodiments of the invention, and those ordinarily skilled in the art can obtain other drawings according to the following ones without creative labor.

DETAILED DESCRIPTION

The technical solutions of the embodiments of the invention will be clearly and completely described below in conjunction with the drawings of these embodiments. Obviously, the embodiments in the following description are merely illustrative ones, and are not all possible ones of the invention.

Figure 1:
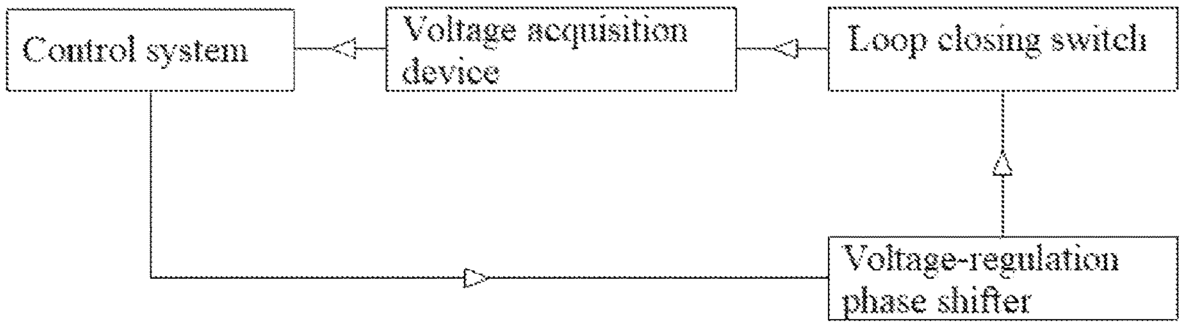
FIG. 1 is a structural diagram of a device for loop closing and breaking of a power distribution grid based on decoupled voltage regulation.

As shown in FIG. 1, a device for loop closing and breaking of a power distribution grid based on decoupled voltage regulation comprises: a voltage-regulation phase shifter, a control system, a voltage acquisition device and a loop closing switch; the voltage acquisition device acquires voltage signals on two sides of the loop closing switch performing a loop closing or breaking operation and transmits the voltage signals to the control system; the control system calculates a compensating voltage amplitude and phase-angle according to the voltage signals and sends an instruction to the voltage-regulation phase shifter according to the compensating voltage amplitude and phase-angle; and the voltage-regulation phase shifter outputs the compensating voltage amplitude and phase angle according to the instruction from the control system, to compensate for a voltage difference between the two sides of the loop closing switch.

According to the invention, through a voltage-regulation phase shift, the loop closing or breaking operation can be effectively implemented in case of a large difference in amplitude and phase angle of bus voltages of a power distribution gird, an excessive loop closing current can be effective avoided in the loop closing process, and false tripping of quick-break protection or over-current protection is avoided.

Figure 2:
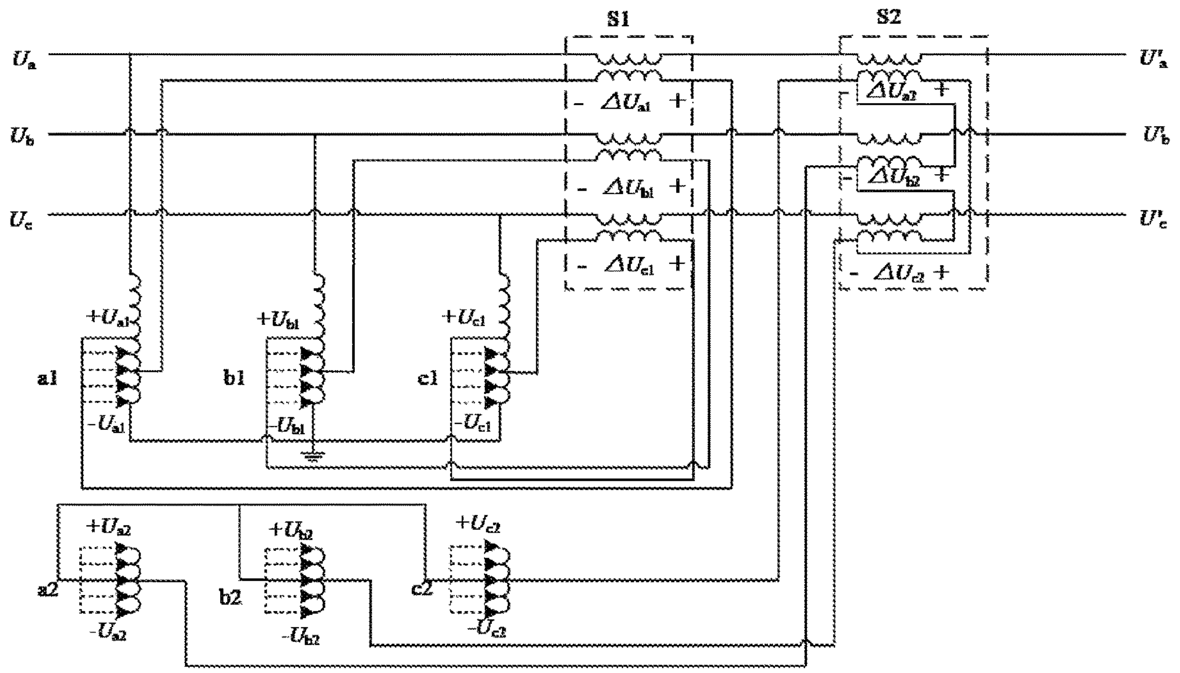
FIG. 2 is a structural diagram of a voltage-regulation phase shifter.

Preferably, as shown in FIG. 2, the voltage-regulation phase shifter comprises a parallel transformer and a series transformer; the parallel transformer is a three-phase three-winding auto-transformer, and comprises primary-side auto-couplings a1, b1 and c1, and secondary-side windings a2, b2 and c2; the series transformer comprises amplitude regulation parts $\Delta U_{a1}$, $\Delta U_{b1}$ and $\Delta U_{c1}$ which form a series winding S1, and phase-angle regulation parts $\Delta U_{a2}$, $\Delta U_{b2}$ and $\Delta U_{c2}$ which form a series winding S2; the amplitude regulation parts $\Delta U_{a1}$, $\Delta U_{b1}$ and $\Delta U_{c1}$ adopt delta connection and are connected to the primary-side auto-couplings of the parallel transformer; the phase-angle regulation parts $\Delta U_{a2}$, $\Delta U_{b2}$ and $\Delta U_{c2}$ adopt star connection and are connected to the secondary-side windings of the parallel transformer; and the control system is connected to taps of the primary-side auto-couplings and taps of the secondary-side windings.

The primary-side auto-couplings a1, b1 and c1 of the three-phase three-winding auto-coupling transformer, and the series winding S1 control the amplitudes $\Delta U_{a1}$, $\Delta U_{b1}$ and $\Delta U_{c1}$ of a compensating voltage, the secondary-side windings a2, b2 and c2, and the series winding S2 control the phase angles $\Delta U_{a2}$, $\Delta U_{b2}$ and $\Delta U_{c2}$ of the compensating voltage, and primary sides of exciting windings are shared, so one winding is omitted; the series winding S1 and the series winding S2 on the series side regulate the amplitude and phase angle of the voltage respectively, so when a fault happens to one series winding, the other series winding can still participate in flow regulation of the power distribution grid, thus improving the operating stability of the device.

Figure 3:
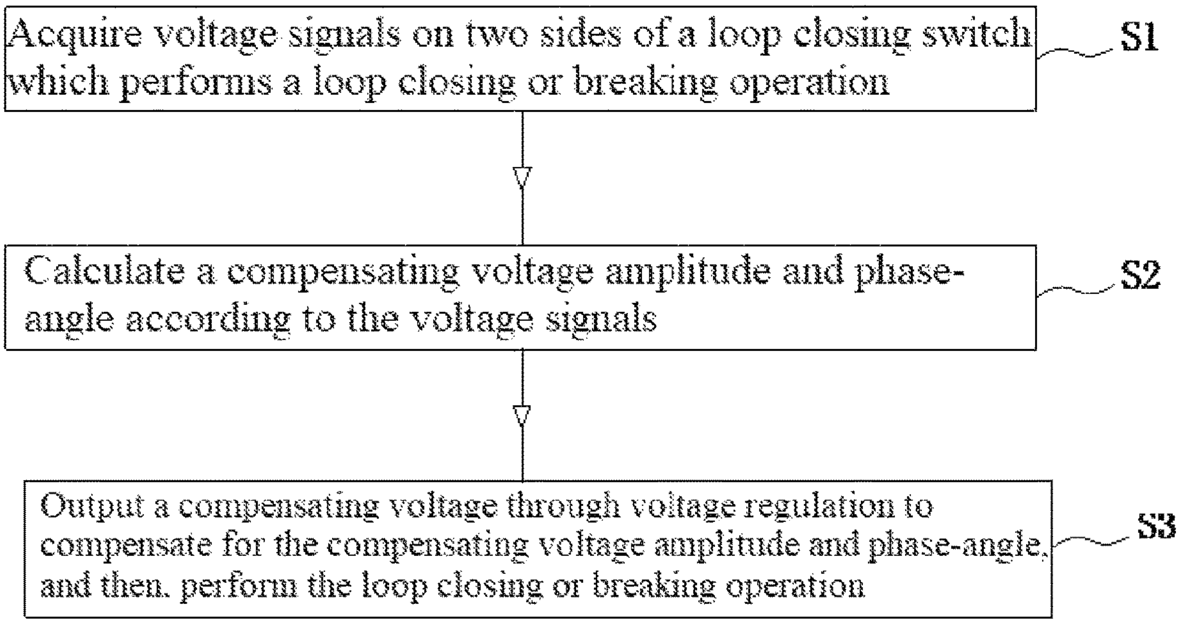
FIG. 3 is a flow diagram of a method for loop closing and breaking of a power distribution grid based on decoupled voltage regulation.

As shown in FIG. 3, a method for loop closing and breaking of a power distribution grid based on decoupled voltage regulation comprises the following steps:

S1: voltage signals on two sides of a loop closing switch performing a loop closing or breaking operation are acquired;

S2: a compensating voltage amplitude and phase-angle are calculated according to the voltage signals; and

S3: a compensating voltage is output through voltage regulation to compensate for the compensating voltage amplitude and phase-angle, and then, the loop closing or breaking operation is performed.

According to the method, in the voltage regulation process, a parallel transformer and a series transformer are used for voltage regulation; the parallel transformer is a three-phase three-winding auto-transformer, and comprises primary-side auto-couplings a1, b1 and c1, and secondary-side windings a2, b2 and c2; the series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; wherein, the amplitude regulation parts $\Delta U_{a1}$, $\Delta U_{b1}$ and $\Delta U_{c1}$ adopt delta connection and are connected to the primary-side auto-couplings of the parallel transformer; and the phase-angle regulation parts $\Delta U_{a2}$, $\Delta U_{b2}$ and $\Delta U_{c2}$ adopt star connection and are connected to the secondary-side windings of the parallel transformer.

Decoupled control of the compensating voltage amplitude and phase-angle is realized through independent regulation of taps of the primary-side auto-windings and taps of the secondary-side windings. Through independent regulation of the taps, when a fault happens to one series winding, the other series winding can still participate in flow regulation of the power distribution grid; by setting the positions of the taps of the primary-side auto-couplings and the secondary-side windings of the voltage-regulation phase shifter, the amplitude and phase angle of busbar voltages on two sides are regulated to be within a certain threshold, such that the loop current during loop closing and breaking is reduced, safe loop closing and breaking are realized, the influence of loop closing and breaking on normal operation of the power distribution grid can be effectively avoided, and the power supply reliability and safety are improved.

Figure 4:
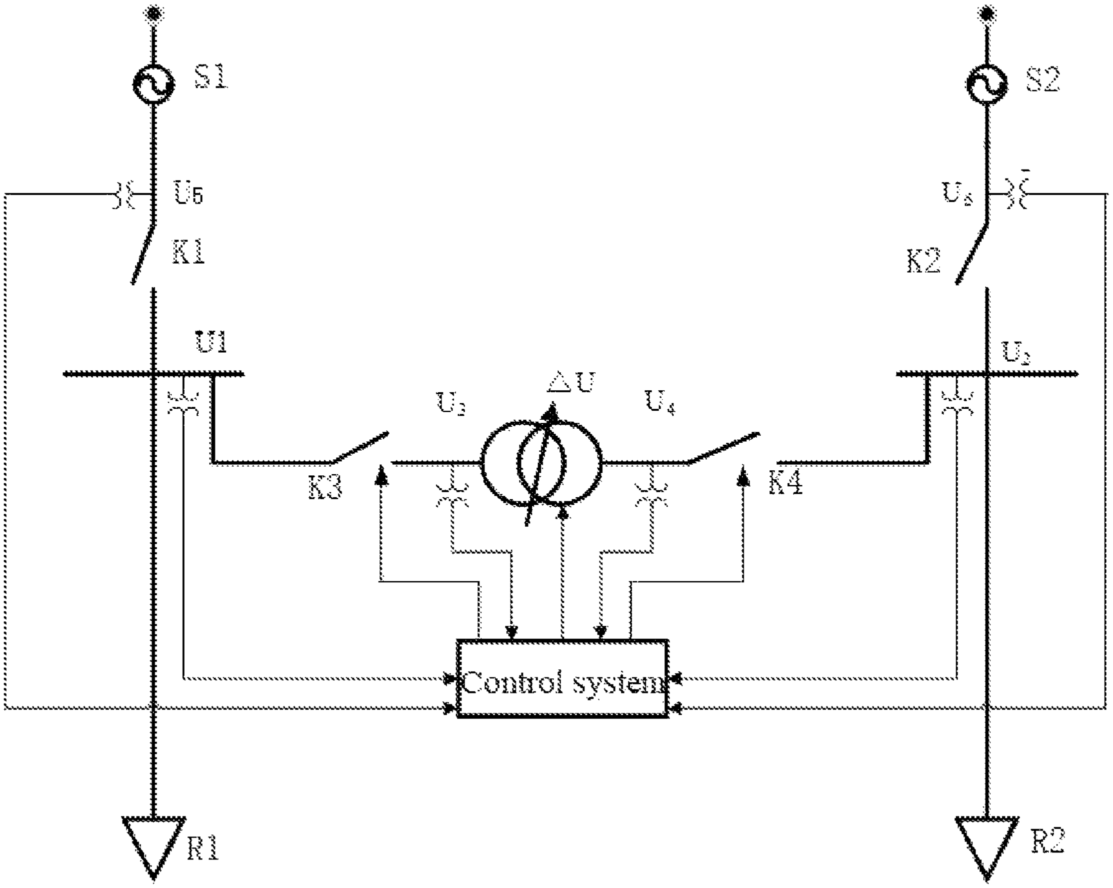
FIG. 4 is a structural diagram of a power distribution grid used based on the device for loop closing and breaking of a power distribution grid based on decoupled voltage regulation.

As shown in FIG. 4, a power distribution grid comprises: a first power supply circuit comprising a power supply $S_1$, a loop closing switch $K_1$ and a load $R_1$ which are connected in series; a second power supply circuit comprising a power supply $S_2$, a loop closing switch $K_2$ and a load $R_2$ which are connected in series; and a voltage-regulation phase shifter, a control system and a voltage acquisition device; a side, connected to the load $R_1$, of the loop closing switch $K_1$ is connected to the voltage-regulation phase shifter through a loop closing switch $K_3$; a side, connected to the load $R_2$, of the loop closing switch $K_2$ is connected to the voltage-regulation phase shifter through a loop closing switch $K_4$; the voltage acquisition device is connected to the control system, the loop closing switch $K_1$, the loop closing switch $K_2$, the loop closing switch $K_3$ and the loop closing switch $K_4$, acquires voltage signals on two sides of a designated loop closing switch, and transmits the voltage signals to the control system; the control system calculates a compensating voltage amplitude and phase-angle according to the voltage signals, and sends an instruction to the voltage-regulation phase shifter according to the compensating voltage amplitude and phase-angle; and the voltage-regulation phase shifter outputs the compensating voltage amplitude and phase-angle according to the instruction from the control system, to compensate for a voltage difference between the two sides of the designated loop closing switch.

In the power distribution grid, only the minimum unit that can fulfill the technical purpose of the invention is protected, and the use of other elements without affecting the working principle of the invention also falls within the protection scope of the invention. The number of the power supply circuits can be further increased as long as the power supply circuits can be connected to the voltage-regulation phase shifter through branch circuits and loop closing switches. During loop closing and breaking process, the two power supply circuits involved in the invention are substantively two power supply circuits participate in the loop closing and breaking.

Wherein, the voltage-regulation phase shifter comprises a parallel transformer and a series transformer; the parallel transformer is a three-phase three-winding auto-transformer, and comprises primary-side auto-couplings a1, b1 and c1, and secondary-side windings a2, b2 and c2; The series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; the amplitude regulation parts $\Delta U_{a1}$, $\Delta U_{b1}$ and $\Delta U_{c1}$ adopt delta connection and are connected to the primary-side auto-couplings of the parallel transformer; the phase-angle regulation parts $\Delta U_{a2}$, $\Delta U_{b2}$ and $\Delta U_{c2}$ adopt star connection and are connected to the secondary-side windings of the parallel transformer; and the control system is connected to taps of the primary-side auto-couplings and taps of the secondary-side windings. The technical effects fulfilled by the preferred solution are identical with the technical effects of the above embodiments, and will no longer be detailed here.

Figure 5:
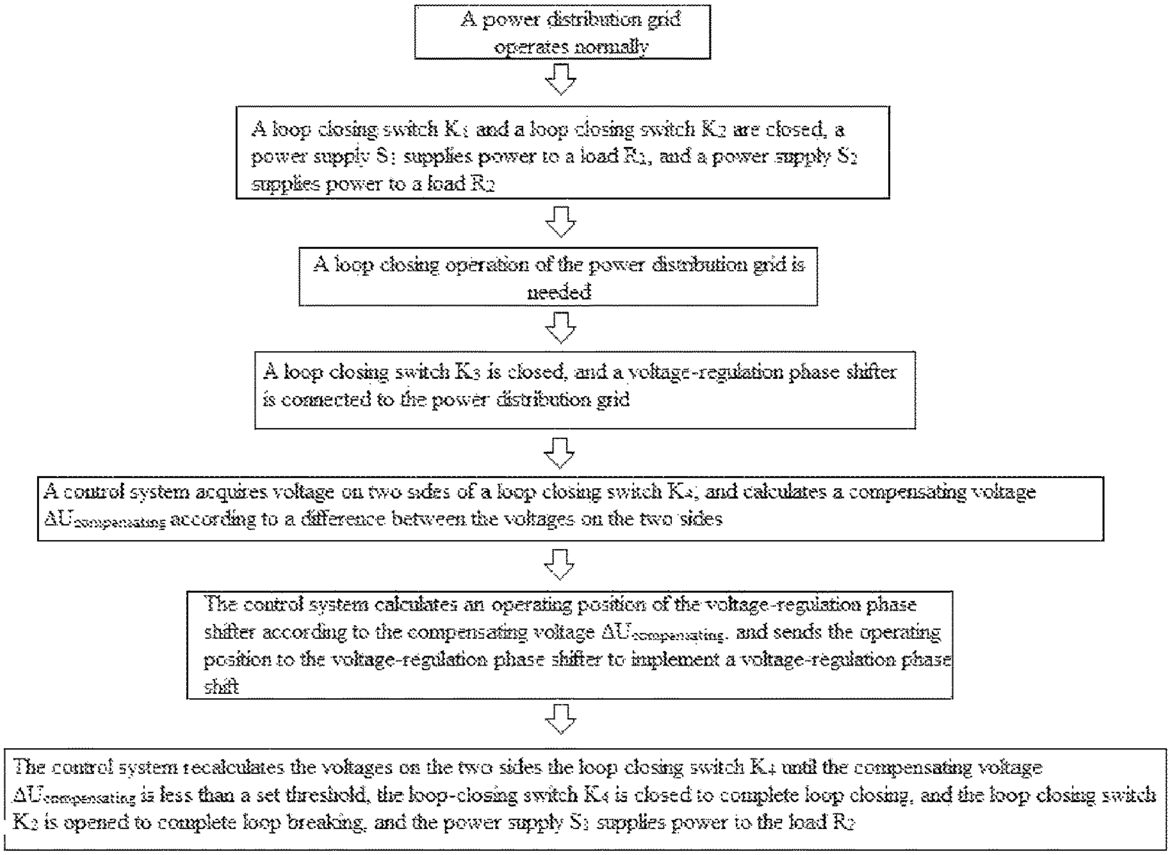
FIG. 5 is a schematic diagram of a loop closing process of the power distribution grid.

During the specific working process, as shown in FIG. 5, when the power distribution grid operates normally, the loop closing switch $K_1$ and the loop closing switch $K_2$ are closed, the power supply $S_1$ supplies power to the load $R_1$, and the power supply $S_2$ supplies power to the load $R_2$; when a loop closing operation of the power distribution grid is needed, the following steps are performed: the loop closing switch $K_3$ is closed, and the voltage-regulation phase shifter is connected to the power distribution grid; the control system acquires voltages on two sides of the loop closing switch $K_4$, and calculates a compensating voltage $\Delta U_{compensating}$ according to a difference between the voltages on the two sides; the control system calculates an operating position of the voltage-regulation phase shifter according to the compensating voltage $\Delta U_{compensating}$, and sends the operating position to the voltage-regulation phase shifter to implement a voltage-regulation phase shift; and the control system recalculates the voltages on the two sides the loop closing switch $K_4$ until the compensating voltage $\Delta U_{compensating}$ is less than a set threshold, the loop-closing switch $K_4$ is closed to complete loop closing, and the loop closing switch $K_2$ is opened to complete loop breaking, and the power supply $S_1$ supplies power to the load $R_2$.

Figure 6:
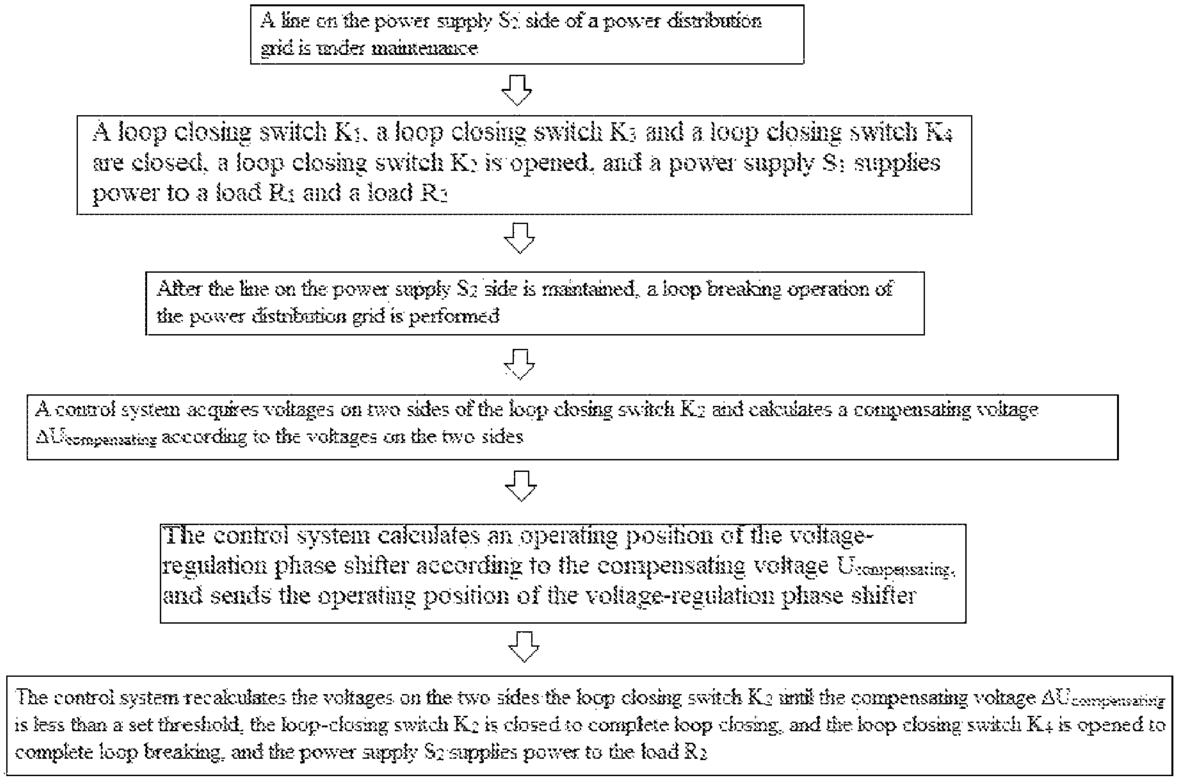
FIG. 6 is a schematic diagram of a loop breaking process of the power distribution grid.

As shown in FIG. 6, when a line on the power supply $S_2$ side of the power distribution grid is under maintenance, the loop closing switch $K_1$, the loop closing switch $K_3$ and the loop closing switch $K_4$ are closed, the loop closing switch $K_2$ is opened, and the power supply $S_1$ supplies power both to the load $R_1$ and the load $R_2$; when the load $R_2$ is switched to be supplied with power by the power supply $S_2$ independently after the line on the power supply $S_2$ side is maintained, a loop breaking operation of the power distribution grid is performed through the following steps:

The control system acquires voltages on two sides of the loop closing switch $K_2$ and calculates a compensating voltage $\Delta U_{compensating}$ according to the voltages on the two sides; the control system controls the voltage-regulation phase shifter to perform voltage regulation according to the compensating voltage $\Delta U_{compensating}$; and the control system recalculates the voltages on the two sides the loop closing switch $K_2$ until the compensating voltage $\Delta U_{compensating}$ is less than a set threshold, the loop-closing switch $K_2$ is closed to complete loop closing, and the loop closing switch $K_4$ is opened to complete loop breaking, and the power supply $S_2$ supplies power to the load $R_2$ to.

The basic principle, main features and advantages of the invention are illustrated and described above. Those skilled in the art should appreciate that the invention is not limited to the above embodiments, these embodiments and the description in this specification are merely used to explain the principle of the invention, various transformations and improvements can be made to the invention without departing from the spirit and scope of the invention, and all these transformations and improvements should fall within the protection scope of the invention. The protection scope of the invention is defined by the appended claims and their equivalents.

What is claimed is:

1. A device for loop closing and breaking of a power distribution grid based on decoupled voltage regulation, comprising: a voltage-regulation phase shifter, a control system, a voltage acquisition device and a loop closing switch, wherein:

the voltage acquisition device acquires voltage signals on two sides of the loop closing switch performing a loop closing or breaking operation and transmits the voltage signals to the control system;

the control system calculates a compensating voltage amplitude and phase-angle according to the voltage signals, and sends an instruction to the voltage-regulation phase shifter according to the compensating voltage amplitude and phase-angle;

the voltage-regulation phase shifter outputs the compensating voltage amplitude and phase-angle according to the instruction from the control system, to compensate for a voltage difference between the two sides of the loop closing switch; wherein, the voltage-regulation phase shifter comprises a parallel transformer and a series transformer;

the parallel transformer is a three-phase three-winding auto-transformer, and comprises primary-side auto-couplings a1, b1 and c1, and secondary-side windings a2, b2 and c2;

the series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; the amplitude regulation parts $\Delta U_{a1}$, $\Delta U_{b1}$ and $\Delta U_{c1}$ adopt delta connection and are connected to the primary-side auto-couplings of the parallel transformer, the phase-angle regulation parts $\Delta U_{a2}$, $\Delta U_{b2}$ and $\Delta U_{c2}$ adopt star connection and are connected to the secondary-side windings of the parallel transformer;

the control system is connected to taps of the primary-side auto-couplings and taps of the secondary-side windings.

2. A method for loop closing and breaking of a power distribution grid based on decoupled voltage regulation, comprising:

acquiring voltage signals on two sides of a loop closing switch which performs a loop closing or breaking operation;

calculating a compensating voltage amplitude and phase-angle according to the voltage signals; and outputting a compensating voltage through voltage regulation to compensate for the compensating voltage amplitude and phase-angle, and then, performing the loop closing or breaking operation, wherein, a parallel transformer and a series transformer are used for voltage regulation, the parallel transformer is a three-phase three-winding auto-transformer, and comprises primary-side auto-couplings a1, b1 and c1, and secondary-side windings a2, b2 and c2;

the series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$ and $\Delta U_{c2}$; wherein, the amplitude regulation parts $\Delta U_{a1}$, $\Delta U_{b1}$ and $\Delta U_{c1}$ adopt delta connection and are connected to the primary-side auto-couplings of the parallel transformer; the phase-angle regulation parts $\Delta U_{a2}$, $\Delta U_{b2}$ and $\Delta U_{c2}$ adopt star connection and are connected to the secondary-side windings of the parallel transformer;

decoupled control of the compensating voltage amplitude and phase-angle is realized through independent regulation of taps of the primary-side auto-windings and taps of the secondary-side windings.

3. A power distribution grid, comprising:

a first power supply circuit comprising a power supply $S_1$, a loop closing switch $K_1$ and a load $R_1$ which are connected in series;

a second power supply circuit comprising a power supply $S_2$, a loop closing switch $K_2$ and a load $R_2$ which are connected in series; and a voltage-regulation phase shifter, a control system and a voltage acquisition device;

wherein, a side, connected to the load $R_1$, of the loop closing switch $K_1$ is connected to the voltage-regulation phase shifter through a loop closing switch $K_3$; a side, connected to the load $R_2$, of the loop closing switch $K_2$ is connected to the voltage-regulation phase shifter through a loop closing switch $K_4$; the voltage acquisition device is connected to the control system, the loop closing switch $K_1$, the loop closing switch $K_2$, the loop closing switch $K_3$ and the loop closing switch $K_4$, acquires voltage signals on two sides of a designated loop closing switch, and transmits the voltage signals to the control system;

the control system calculates a compensating voltage amplitude and phase-angle according to the voltage signals, and sends an instruction to the voltage-regulation phase shifter according to the compensating voltage amplitude and phase-angle;

the voltage-regulation phase shifter outputs the compensating voltage amplitude and phase-angle according to the instruction from the control system, to compensate for a voltage difference between the two sides of the designated loop closing switch; wherein the voltage-regulation phase shifter comprises a parallel transformer and a series transformer, the parallel transformer is a three-phase three-winding auto-transformer, and comprises primary-side auto-couplings a1, b1 and c1, and secondary-side windings a2, b2 and c2;

the series transformer comprises amplitude regulation parts $\Delta U_{a1}$, $\Delta U_{b1}$ and $\Delta U_{c1}$, and phase-angle regulation parts $\Delta U_{a2}$, $\Delta U_{b2}$, and $\Delta U_{c2}$; the amplitude regulation parts $\Delta U_{a1}$, $\Delta U_{b1}$ and $\Delta U_{c1}$ adopt delta connection and are connected to the primary-side auto-couplings of the parallel transformer, the phase-angle regulation parts $\Delta U_{a2}$, $\Delta U_{b2}$ and $\Delta U_{c2}$ adopt star connection and are connected to the secondary-side windings of the parallel transformer;

the control system is connected to taps of the primary-side auto-couplings and taps of the secondary-side windings.

4. The power distribution grid according to claim 3, wherein when the power distribution grid operates normally, the loop closing switch $K_1$ and the loop closing switch $K_2$ are closed, the power supply $S_1$ supplies power to the load $R_1$, and the power supply $S_2$ supplies power to the load $R_2$; when a loop closing operation of the power distribution grid is needed, the following steps are performed;

closing the loop closing switch $K_3$, and connecting the voltage-regulation phase shifter to the power distribution grid;

acquiring, by the control system, voltages on two sides of the loop closing switch $k_4$, and calculating a compensating voltage according to a difference between the voltages on the two sides, calculating, by the control system, an operating position of the voltage-regulation phase shifter according to the compensating voltage, and sending the operating position to the voltage-regulation phase shifter to implement a voltage-regulation phase shift; and recalculating, by the control system, the voltages on the two sides the loop closing switch $K_4$ until the compensating voltage is less than a set threshold, closing the loop-closing switch $K_4$ to complete loop closing, and opening the loop closing switch $K_2$ to complete loop breaking, and supplying power to the load $R_2$ by the power supply $S_1$.

5. The power distribution grid according to claim 3, wherein when a line on the power supply $S_2$ side of the power distribution grid is under maintenance, the loop closing switch $K_1$, the loop closing switch $K_3$ and the loop closing switch $K_4$ are closed, the loop closing switch $K_2$ is opened, and the power supply $S_1$ supplies power to the load $R_1$ and the load $R_2$; when the load $R_2$ is switched to be supplied with power by the power supply $S_2$ independently after the line on the power supply $S_2$ side is maintained, a loop breaking operation of the power distribution grid is performed through the following steps:

acquiring, by the control system, voltages on two sides of the loop closing switch $K_2$, and calculating a compensating voltage according to a difference between the voltages on the two sides;

controlling, by the control system, the voltage-regulation phase shifter to perform voltage regulation according to the compensating voltage, and recalculating, by the control system, the voltages on the two sides the loop closing switch $K_2$ until the compensating voltage is less than a set threshold, closing the loop-closing switch $K_2$ to complete loop closing, and opening the loop closing switch $K_4$ to complete loop breaking, and supplying power to the load $R_2$ by the power supply $S_2$.

6. The power distribution grid according to claim 3, wherein the control system realizes decoupled control of the compensating voltage amplitude and phase-angle through independent regulation of the taps of the primary-side auto-couplings and the taps of the secondary-side windings.

* * * * *